Sept. 27, 1955          G. WRIGHT          2,719,196

LIQUID LEVEL INDICATING AND SIGNALING DEVICE

Filed Nov. 18, 1952

INVENTOR.
Galileo Wright.
BY
Wood, Herron & Evans.
ATTORNEYS.

United States Patent Office 2,719,196
Patented Sept. 27, 1955

2,719,196

LIQUID LEVEL INDICATING AND SIGNALING DEVICE

Galileo Wright, Mount Orab, Ohio

Application November 18, 1952, Serial No. 321,120

6 Claims. (Cl. 200—84)

This invention relates to gauges for indicating the level of a liquid within a sealed container, and is particularly directed to a gauge which is adapted to provide a signal at a point remote from the container whenever the liquid drops below a predetermined level.

In recent years the use of liquefied gas, or "bottled" gas, as it is more commonly referred to as a fuel for heating and cooking purposes, has become very widespread. This is particularly true in rural areas where bottled gas is used not only in places of business and homes, but in various outbuildings as well. In a typical installation, a relatively large tank is placed outside of a building where it is readily accessible for filling. The tank is connected through suitable piping to the interior of the building where it is joined to a stove, heater, or other similar device.

The capacity of the containers, or tanks, employed to store the gas varies, but practically all of the tanks are of such limited capacity that they must be refilled frequently. Generally this is done by a local dealer who, in response to a call from the householder or other user, delivers a sufficient quantity of liquid fuel to fill the tank.

To provide the householder with a means for determining the amount of gas remaining, it is conventional to provide a gauge which is placed upon the tank and is effective to measure the level of the liquid gas. Many different types of gauges are available, most of which will provide a relatively accurate level measurement. However, despite the fact that a gauge is provided on the tank for determining the amount of gas available, a large number of householders are continually running out of gas and calling dealers to make deliveries at all hours of the night. From the dealer's point of view this is very unsatisfactory, for while he must render good service to keep his customers, it is extremely inconvenient and highly uneconomical for him to make a single delivery in the middle of the night.

The reason why householders run out of gas, despite the fact that they have means for determining when they are about to do so, is quite simple. As was pointed out above, the tanks are placed out-of-doors, often at a substantial distance from the house or other building. In fact, various State regulations specify that at least large tanks, suitable for heating, etc., must be placed a prescribed distance, generally upward of twenty-five feet from a building. Thus, it is a disagreeable task for a person to go out into the cold and regularly read the gauge on the tank to see how much fuel he has remaining; especially if the weather is bad, or there is snow on the ground, it is natural to postpone reading the gauge. Often, the postponement of a reading results in the tank's being emptied before the householder is aware that he is low on gas.

It is a principal object of this invention to provide a simple means whereby a visual signal is given within the house, or at some other point remote from the tank, whenever the liquid in the tank drops below a predetermined level. For example, a warning light may be lit whenever the gas remaining is less than twenty per cent of the tank's capacity. If the light is placed in a conspicuous place, the householder will almost assuredly notice it shortly after it has been energized; and if the dealer is promptly notified, he will have several days in which to make a delivery. Thus, his deliveries can be made during his regular course of business, and he will have an opportunity to schedule his delivery routes in advance.

Heretofore, there have been a number of proposals for remote reading level indicators. That none of these devices has been satisfactory, is attested to by the fact that nowhere are they in widespread use. Generally, the proposed devices have included a movable contact which makes frictional engagement with a fixed contact to complete an electrical circuit whenever the measuring gauge indicates the level within the tank has dropped below a predetermined value. Such indicators require delicate adjustment, and when attempts have been made to employ them in conjunction with liquid bottle gas installations, they have proved too unreliable for satisfactory service. To secure good electrical contact, an excessive amount of frictional engagement is required so that the gauges tend to bag and yield highly erroneous readings. For various other reasons, such gauges also have a tendency to "stick" and in general the remote indicating mechanism interferes with the operation of the gauge to an extent where the utility of the gauge is greatly impaired.

A second method of providing a remote indication involves the provision of a rheostat having a movable contact associated with the gauge mechanism, and in electrical series connection with the power source and a lamp. The lamp is of a type such that it glows only when the applied voltage exceeds a critical value. This critical value is reached when the gauge mechanism moves the contact to a position on the rheostat corresponding to a predetermined liquid level within the tank. This system too, has proved unsatisfactory because of the inaccuracies introduced due to the excessive amount of friction involved, and also because of the inherently fine adjustment required to make the system operative.

It is one objective of this invention to provide a remote level indicating device which is adapted for use with conventional level gauges, and is operated by a suitable mechanism in such a manner that it does not interfere with the operation of the gauge so that the gauge will continue to yield accurate readings throughout its entire range.

The present invention is predicated upon the concept of providing a simple yieldable abutting contact which can be used in conjunction with a conventional gauge in such a manner that a circuit is closed whenever the gauge reading drops below a predetermined level. There is no frictional engagement whatsoever, and the yieldable contact does not offer sufficient resistance to gauge movement so as to impair the accuracy of the gauge readings. Furthermore, the contact does not affect the operation of the gauge at all whenever the liquid level exceeds the predetermined value chosen for indication.

Another important object of this invention is to provide a remote indicating device of such a construction that almost any of the gauges conventionally employed for level measurement can readily be modified to incorporate the device without removing the gauge from the tank on which it is installed, or without disrupting the supply of gas from the tank in any manner.

In order that the significance of these objectives may be more fully appreciated, a brief description will be given of a conventional liquid level gauge and the manner in which it is modified to provide remote indication. Generally, a gauge of the type currently in use includes a float which rises and falls in accordance with the level of the liquid within the tank. A drive magnet, which is completely encased and sealed in communication with the tank, is rotated through any suitable mechanism so that its position also reflects the liquid level. A second indicating magnet is mounted for rotation at a point close to the drive magnet, and is driven by magnetic force in response to movement of the drive magnet. A dial bearing suitable indicia is associated with the indicating magnet to yield a visual indication of the amount of fuel remaining. To complete the gauge, a glass cover encloses the indicating needle and protects it from the entrance of moisture and dirt.

The present invention contemplates the removal of the glass cover and the substitution of a non-magnetic, non-conducting, cover member which may be constructed of Lucite or some such material. The conventional, light, indicating needle is also replaced with a heavier, relatively powerful needle including an upstanding contact finger. The contact finger is adapted for engagement with a yieldable contact member which is mounted on the wall of the cover member and extends into the path of the contact finger. The contact member and finger constitute the two elements of a switch which is placed in series connection with a power source and an electric light bulb or other indicating element.

Preferably, the contact member or arm, is in the form of a thin, light, elongate spring. The arm is mounted on one end to the cover member, and the other end is adapted for engagement by the contact finger. The spring and contact finger are positioned so that when the indicating needle of the gauge corresponds to a predetermined level within the tank; for example, twenty per cent of the tank's capacity, the finger will engage the contact member. One lead of the electrical circuit is joined to the contact member, and another lead is connected through the gauge structure to the finger; so that when the two are in engagement, an electrical circuit is completed.

One of the advantages of this arrangement is that there is an abutting engagement between the spring and finger which provides a good electrical contact, yet the resistance offered by the light spring to rotation of the magnetic needle is not sufficient to appreciably affect the gauge reading.

Other objects of the present invention will be apparent from a consideration of the following description of the drawings illustrating a preferred embodiment of my invention.

Figure 2:
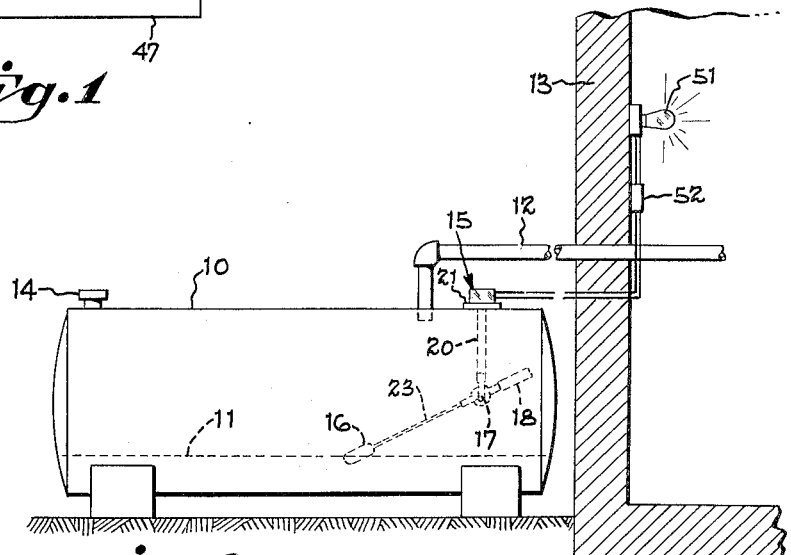
Figure 2 is a diagrammatic view showing a typical bottle gas installation embodying the indicating device of the present invention.
Figure 4:
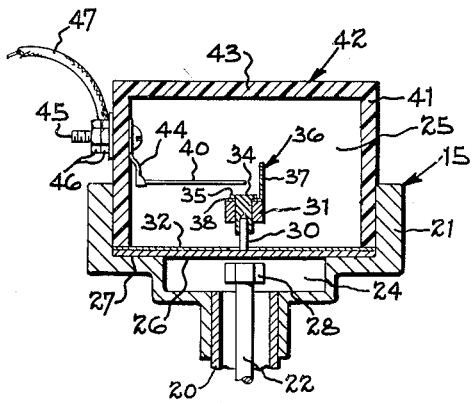
Figure 4 is a cross sectional view taken along the line 4—4 of Figure 3.
Figure 3:
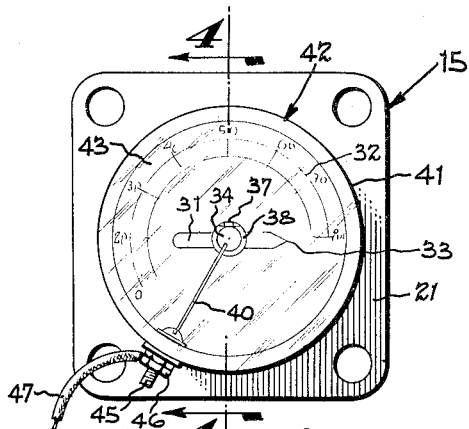
Figure 3 is an elevational view of a gauge constructed in accordance with the principles of this invention.

As shown in Figure 2, a typical bottle gas installation includes a tank, or container 10, in which a quantity of a liquid gas 11, such as butane or propane, is stored under high pressure. A portion of the liquid gas vaporizes and fills the space above the liquid. A suitable pipe 12 connects the tank, which is generally placed outside of a buiding 13 such as a home, chicken house or the like, to the interior of the building where the gas is supplied to a device such as a stove, heater, or chicken brooder. A suitable opening normally closed by removable cap 14, is provided for filling the tank.

A liquid level gauge 15 is mounted upon the tank to provide the user with a means of determining the amount of gas remaining in the tank. The basis gauge mechanism may be of any suitable type; I have illustrated a conventional gauge of the type marketed under the name "Visible Sr." by the J. Y. Taylor Co. Substantially all of the gauges currently in use are of a similar construction. As shown, the gauge includes a float 16 which is pivotally mounted at 17 and counterweighted as at 18. A vertical sleeve or casing 20, extends upwardly through an opening in the tank, and terminates in a flange 21 which is bolted to the tank and forms a gas tight seal with the tank wall. A shaft 22 is mounted for rotation within the sleeve 20; the shaft is provided at its lower end with a pinion for engaging a segmental gear mounted on the rod 23, joining float 16 and counterweight 18. By means of the pinion and gear, angular displacements of the float, accompanying changes in liquid level, are translated into rotations of shaft 22.

Flange 21 is constructed of a non-magnetic material and is hollowed out to provide two central chambers, a lower chamber 24 and an upper chamber 25. The two chambers are separated by a non-magnetic plate 26 which is secured about its peripheral portion to shoulder 27, forming a gas-tight seal therewith. A bar magnet 28 is mounted on the upper end of shaft 22 for rotation in chamber 24. A pin or post 30 is secured to plate 26, and serves as a pivot point for a second magnet 31. The upper magnet is driven in accordance with the movements of the lower magnet so that its position accurately reflects the displacement of shaft 22, and consequently the height of float 16. A dial 32, provided with suitable indicia, is secured to plate 26, and in cooperation with point 33 of magnet 31, provides a visual indication of the quantity of liquid gas remaining in the tank. This much of the gauge is conventional, and the exact details of its construction do not constitute any part of the present invention. Additionally, a conventional gauge is provided with a flat glass cover which extends across the top of flange 21 and functions to seal the upper chamber. This cover is removed and discarded when the gauge is modified to provide remote liquid level indication.

The present low level indicating apparatus can be used in conjunction with any gauge of this general type, that is with a gauge having an indicating magnet rotatable in response to movements of a drive magnet, in turn positioned in accordance with the level of a float. From the following description, it will be apparent to those skilled in the art how other conventional level gauges, differing slightly from the one shown, may be modified to provide remote low level indication in accordance with the principles of this invention.

In the particular gauge shown, indicating magnet 31 is provided with a central bore in which a bushing 34 is fitted. The bushing includes a hollow portion which fits over pivot pin 30, and a cap portion 35, effective to hold contact member 36 in place on the magnet. Contact member 36 includes an upright finger 37 and an annular ring 38 which receives the bushing 34 and is held in place by cap 35.

A contact arm 40 adapted for engagement with finger 37 extends radially from wall 41 of cover 42. As shown, the cover is constituted by a cylindrical member which is provided with a transparent top 43. The cover member may be fabricated of any suitable material such as Lucite, and is preferably non-magnetic and a non-conductor of electricity. Contact arm 40 is soldered, or otherwise secured, to a bracket 44 which is in turn secured to the wall 41 of the cover 42 as by means of bolt 45 and nuts 46. An electrical lead 47 is taken from the contact arm, or more particularly from the terminal formed by bolt 45 and nuts 46.

Figure 1:
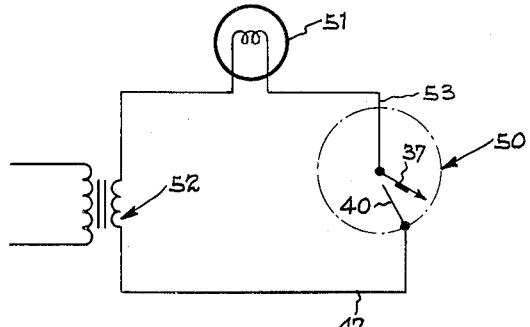
Figure 1 is a schematic circuit diagram of the low level indicating device.

Contact finger 37 and arm 40 cooperate to provide a switch indicated at 50 in Figure 1, the switch being closed when the finger is in engagement with arm 40, and being open when the two elements are separated. The switch is placed in series connection with a light bulb 51. Power for the circuit is provided from a suitable source such as step down transformer 52; however since the circuit is normally open, it is feasible to employ other sources such as batteries if regular alternating current is not readily available. A lead 53 joins one end of the filament of bulb 51 to flange 21 of the gauge, and hence through plate 26 to contact 36. Obviously, this may be accomplished by grounding both the gauge and one end of the lamp bulb. The other end of the bulb filament is connected to power source 52, which is in turn joined through lead 47 to contact arm 40. Whenever contact finger 37 engages contact arm 40, the circuit to bulb 51 is completed and that bulb will be lit.

Arm 40 is mounted at a point on the periphery of wall member 41, so that it will be engaged by finger 37 just as the indicating magnet rotates to a point corresponding to the level at which remote visual indication is desired. For a tank of average capacity, I have found it preferable to have the indicator activated when the level drops to approximately twenty per cent of the full volume. This in general will give the householder ample warning, perhaps two or three days, to order fuel and have it delivered without interrupting the normal business of the dealer.

Contact arm 40 is preferably constituted by a thin narrow readily yieldable spring. While it is possible to mount the spring in positions other than on the side wall as shown, this particular mounting has several advantages. In the first place, the spring and its associated bracket do not interfere with the view of anyone attempting to read the gauge. Furthermore, the spring is of maximum length and since it is mounted at one end and engaged at the other, it will yield most readily under the pressure of finger 37. Thus, the spring does not appreciably impede the movement of the indicating needle, and the accuracy of the gauge is not adversely affected after electrical contact has been made.

It should be noted that there is a strict abutting contact between the contact arm and contact finger, so that as opposed to a sliding frictional contact, all of the impeding force of the spring is effective to provide a firm electrical contact between the contact arm and finger. Furthermore, the spring exerts no influence whatsoever upon the operation of the gauge whenever the liquid level exceeds twenty per cent, or whatever other level is chosen for indication. Also, in regard to the electrical contact, it should be pointed out that finger 37 is disposed adjacent to the pivot point of the needle, so that it rotates on a small radius and displaces the spring only a minimum amount in moving from a position corresponding to the predetermined level (the twenty per cent mark in the present illustration) down to the empty mark. This, coupled with the minimum torque arm associated with the finger, also minimizes the retarding effect of the finger's engagement with the spring upon rotation of the indicating magnet.

While it is contemplated that a gauge may be constructed so as to embody the indicating device as an integral part, it is of prime importance that a convenient gauge of the type shown, or in fact any gauge of similar construction, can be readily modified to embody the liquid level indicating device. This can be accomplished without removing the gauge from the tank or without interfering in any way with the operation of the installation. In modifying such a gauge, the first step is to remove the glass cover which normally is in the upper chamber 25; next the needle normally furnished with such gauges is replaced by a needle of the type shown. Generally, the needle furnished as a standard component of a conventional gauge is thin and relatively weak in magnetic power, much like a compass needle, and does not have the requisite power to firmly close a pair of electrical contacts. Consequently, it is replaced with a heavier, more powerful needle, preferably made from a strongly magnetic material such as "Alnico." After the new needle, together with the bushing and contact finger, has been placed upon pivot pin 30, the cover member 42 is placed within upper chamber 25, and is rotated so that contact arm 40 is disposed in a proper position relative to the dial so that the arm will be engaged by finger 37 just as the needle swings to the predetermined level reading. Cover member 42 may be secured in place by any suitable manner such as by press fitting, or may be held in place by a mastic or other adhesive compound. Preferably, it is sealed in some manner to provide a watertight enclosure for the upper chamber. Lead 47 is then connected to transformer 52 or other power source, which is joined to the bulb socket, and the other lead from the socket is either grounded or connected to the tank.

It can be seen that it is an extremely simple matter to modify a conventional gauge to provide means for securing a remote low level warning. This work can be performed by relatively unskilled persons; nevertheless, the indicator will be very reliable since it is of such simple construction.

Having described my invention I claim:

1. Apparatus for converting a liquid level gauge of a type having a drive magnet and a driven indicating magnet into a device for indicating at a point remote from the gauge when the level of a liquid within a tank falls below a predetermined level, said indicating magnet being rotatably mounted in a chamber within said gauge, said apparatus comprising an electrically conductive contact finger associated with said indicating magnet means for providing an electrical connection to said contact finger, an electrically conductive contact arm, a top member adapted to enclose said chamber, one end of said contact arm being secured to said top member means carried by said top member for providing electrical connection to the contact arm, the other end of said arm projecting into the path of the contact finger, said finger and arm being disposed relative to one another so that they will be brought into engagement completing an electric circuit when the indicating needle is rotated into a position corresponding to a predetermined liquid level.

2. Apparatus for converting a liquid level gauge of a type having a drive magnet and a driven indicating magnet into a device for indicating at a point remote from the gauge when the level of a liquid within a tank falls below a predetermined level, said indicating magnet being rotatably mounted in a chamber within said gauge, said apparatus comprising an electrically conductive contact finger mounted on said indicating magnet at a point adjacent the pivot point of said magnet means for providing electrical connection to said magnet, an electrically conductive contact arm, a cover member adapted to enclose said chamber, said cover member including side walls and a transparent top, one end of said contact arm being secured adjacent a side wall of said cover member means carried by said cover member for providing electrical connection to said contact arm, the other end of said arm projecting into the path of the contact finger, said finger and arm being disposed relative to one another so that they will be brought into engagement when the indicating needle is rotated into a position corresponding to a predetermined liquid level.

3. A liquid level gauge and indicating device comprising a drive magnet, means for turning said drive magnet in accordance with variations of liquid level, an indicating magnet, said indicating magnet being rotated in accordance with the position of the drive magnet, indicia adapted for cooperation with said indicating magnet to indicate liquid level, an electrically conductive contact finger mounted upon said indicating magnet means for providing electrical connection to said magnet, an electrically conductive contact arm constituted by a light spring rigidly mounted at one end, means for providing an electrical connection to said spring, the other end of said spring projecting into the path of said contact finger and being positioned relative thereto, whereby said contact finger and contact arm are brought into engagement completing an electric circuit when the indicating magnet is in a position corresponding to a predetermined liquid level.

4. A liquid level gauge and indicating device comprising a drive magnet, means for turning said drive magnet in accordance with variations of liquid level, an indicating magnet, said indicating magnet being rotated in accordance with the position of the drive magnet, indicia adapted for cooperation with said indicating magnet to indicate liquid level, an electrically conductive contact finger mounted upon said indicating magnet means for providing electrical connection to said magnet, a cover member enclosing said indicating magnet, said cover having a side wall and a transparent top, an electrically conductive contact arm constituted by a light spring rigidly mounted at one end adjacent a side wall of said cover member, means carried by said member for providing an electrical connection to said spring, the other end of said spring projecting into the path of said contact finger and being positioned relative thereto, whereby said contact finger and contact arm are brought into engagement completing an electrical circuit when the indicating magnet is in a position corresponding to a predetermined liquid level.

5. A liquid level gauge and remote low level indicating device comprising a drive magnet, means for turning said drive magnet in accordance with variations of liquid level, an indicating magnet, said indicating magnet being positioned in accordance with the position of the drive magnet, indicia adapted for cooperation with said indicating magnet to indicate liquid level, an electrically conductive contact finger mounted upon said indicating magnet adjacent to the pivot point thereof, means for providing an electrical connection to said magnet, an electrically conductive, contact arm constituted by a light spring rigidly mounted at one end, means for providing an electrical connection to said contact arm, the other end of said spring projecting into the path of said contact finger and being positioned relative thereto, whereby said contact finger and contact arm are brought into engagement completing an electric circuit when the indicating needle is in a position corresponding to a predetermined liquid level.

6. A liquid level gauge and indicating device comprising a drive magnet, means for turning said drive magnet in accordance with variations of liquid level, an indicating magnet, said indicating magnet being positioned in accordance with the position of the drive magnet, indicia adapted for cooperation with said indicating magnet to indicate liquid level, an upstanding electrically conductive contact finger mounted upon said indicating magnet at a point adjacent to the pivot point thereof, means providing an electrical connection to said magnet, a cover member including a side wall and a transparent top for enclosing said indicating magnet, an electrically conductive contact arm constituted by a light spring rigidly mounted at one end to a wall of said cover member, means carried by said member for providing an electrical connection to said spring, the other end of said spring projecting into the path of said contact finger and being positioned relative thereto, whereby said contact finger and contact arm are brought into engagement completing an electric circuit when the indicating needle is in a position corresponding to a predetermined liquid level.

References Cited in the file of this patent
UNITED STATES PATENTS

| | | |
|---|---|---|
| 2,098,085 | D'Arcey | Nov. 2, 1937 |
| 2,127,422 | Phaneuf | Aug. 16, 1938 |
| 2,356,652 | Connolly et al. | Aug. 22, 1944 |
| 2,620,412 | Ford | Dec. 2, 1952 |